(12) United States Patent
Nakayama et al.

(10) Patent No.: US 7,974,780 B2
(45) Date of Patent: Jul. 5, 2011

(54) ROUTE NAVIGATION SYSTEMS, METHODS, AND PROGRAMS

(75) Inventors: Takaaki Nakayama, Okazaki (JP); Shino Oonishi, Okazaki (JP); Kensuke Takeuchi, Okazaki (JP)

(73) Assignee: Aisin AW Co., Ltd., Anjo (JP)

( * ) Notice: Subject to any disclaimer, the term of this patent is extended or adjusted under 35 U.S.C. 154(b) by 221 days.

(21) Appl. No.: 11/589,899

(22) Filed: Oct. 31, 2006

(65) Prior Publication Data

US 2007/0106470 A1  May 10, 2007

(30) Foreign Application Priority Data

Oct. 31, 2005  (JP) ................................ 2005-317760

(51) Int. Cl.
*G01C 21/32* (2006.01)
(52) U.S. Cl. ........ 701/211; 701/202; 701/208; 701/209; 701/210; 340/901; 340/933; 340/988; 340/990
(58) Field of Classification Search .................. 701/200, 701/216, 217
See application file for complete search history.

(56) References Cited

U.S. PATENT DOCUMENTS

| | | | | |
|---|---|---|---|---|
| 6,061,628 A * | 5/2000 | Hayashi et al. | | 701/208 |
| 6,084,543 A * | 7/2000 | Iizuka | | 342/357.13 |
| 6,411,898 B2 * | 6/2002 | Ishida et al. | | 701/211 |
| 6,510,386 B2 * | 1/2003 | Sakashita | | 701/211 |
| 2001/0049582 A1 | 12/2001 | Sakashita | | |
| 2002/0053984 A1 * | 5/2002 | Yamashita et al. | | 340/988 |
| 2004/0186663 A1 * | 9/2004 | Irie | | 701/211 |
| 2005/0261831 A1 | 11/2005 | Irie | | |
| 2007/0106470 A1 * | 5/2007 | Nakayama et al. | | 701/211 |

FOREIGN PATENT DOCUMENTS

| | | |
|---|---|---|
| EP | 0 803 853 A1 | 10/1997 |
| EP | 1 072 863 A2 | 1/2001 |
| JP | A 07-098233 | 4/1995 |

* cited by examiner

*Primary Examiner* — Mark Hellner
*Assistant Examiner* — Redhwan Mawari
(74) *Attorney, Agent, or Firm* — Oliff & Berridge, PLC

(57) ABSTRACT

Navigation systems, methods and programs detect the current location of a vehicle and search a route to a destination based on the current location. The systems, methods, and programs set a guidance intersection based on the searched route, set a route guidance point at a predetermined point before the guidance intersection, and provide route guidance through the guidance intersection when the vehicle reaches the route guidance point. The systems, methods, and programs determine whether the guidance intersection is a guidance intersection where lane planning can be readily performed by a user, even if lane guidance is not performed by the controller. The systems, methods, and programs prevent lane guidance at the predetermined route guidance point from being performed if it is determined that lane planning can be readily performed by the user at the guidance intersection.

11 Claims, 13 Drawing Sheets

ROUTE NAVIGATION SYSTEMS, METHODS, AND PROGRAMS

CROSS-REFERENCE TO RELATED APPLICATION

The disclosure of Japanese Patent Application No. 2005-317760 filed on Oct. 31, 2005, including the specification, drawings and abstract, is incorporated herein by reference in its entirety.

BACKGROUND

Related technical fields include route guidance systems, methods and programs.

In prior navigation system devices, for example, an arrangement has been made wherein the current location of a vehicle is detected by GPS (Global Positioning System), map data is read out from a data recording unit, and a map screen is displayed on a display unit which represents the current location of the vehicle, the map around the vehicle, and other variables. Accordingly, a driver can drive a vehicle in accordance with the vehicle location and so forth displayed on the map screen.

Also, upon the driver inputting a destination and setting search conditions, route-search processing is performed. In route search processing, a route from a departing location, represented by the current location of the vehicle, to a destination, is searched in accordance with the map data. Subsequently, the route search results and the current location of the vehicle are displayed, and route guidance is performed. Accordingly, the driver can drive the vehicle along the search route as displayed.

Incidentally, with route guidance, an arrangement is made wherein prior to a predetermined point, such as a point necessary to turn the vehicle to the right or left at an intersection, voice is output to perform route guidance. Accordingly, one or more route guidance points are set at points prior to the predetermined points on the searched route, and upon the vehicle reaching each of the points prior to the predetermined points, route content is output with voice (e.g., see Japanese Unexamined Patent Application Publication No. 7-98233).

Also, with a navigation device capable of performing route guidance for separate lanes, and in the event that multiple lanes are formed on a road entering the guidance intersection (hereafter "entrance road"), the route guidance process recommends a lane, and the vehicle is guided from the current driving lane tithe recommended lane.

However, with the above conventional navigation device, route guidance is output with voice even at guidance intersections which can be easily passed through without route guidance for each lane, such that route guidance becomes unnecessarily complicated.

SUMMARY

Accordingly, exemplary implementations of the broad principles described herein are explained based on examples in which the principles are applied to assistance for drivers approaching route guidance points, such as intersections.

Exemplary implementations provide navigation systems, methods and programs that may detect the current location of a vehicle and may search a route to a destination based on the current location. The systems, methods, and programs may set a guidance intersection based on the searched route, may set a route guidance point at a predetermined point before the guidance intersection, and may provide route guidance through the guidance intersection when the vehicle reaches the route guidance point. The systems, methods, and programs may determine whether the guidance intersection is a guidance intersection where lane planning can be readily performed by a user, even if lane guidance is not performed by the controller. The systems, methods, and programs may prevent lane guidance at the predetermined route guidance point from being performed if it is determined that lane planning can be readily performed by the user at the guidance intersection.

According to the present invention, in the event that lane planning can be readily performed even though a guidance intersection performs no lane guidance, lane guidance is prevented from being performed at a predetermined route guidance point, whereby route guidance can be simplified.

BRIEF DESCRIPTION OF THE DRAWINGS

Exemplary implementations will now be described with reference to the accompanying drawings, wherein.

DETAILED DESCRIPTION OF EXEMPLARY IMPLEMENTATIONS

Below, exemplary implementations of the broad principles described herein are explained based on examples in which the principles are applied to assistance for drivers approaching route guidance points, such as intersections.

Figure 1:
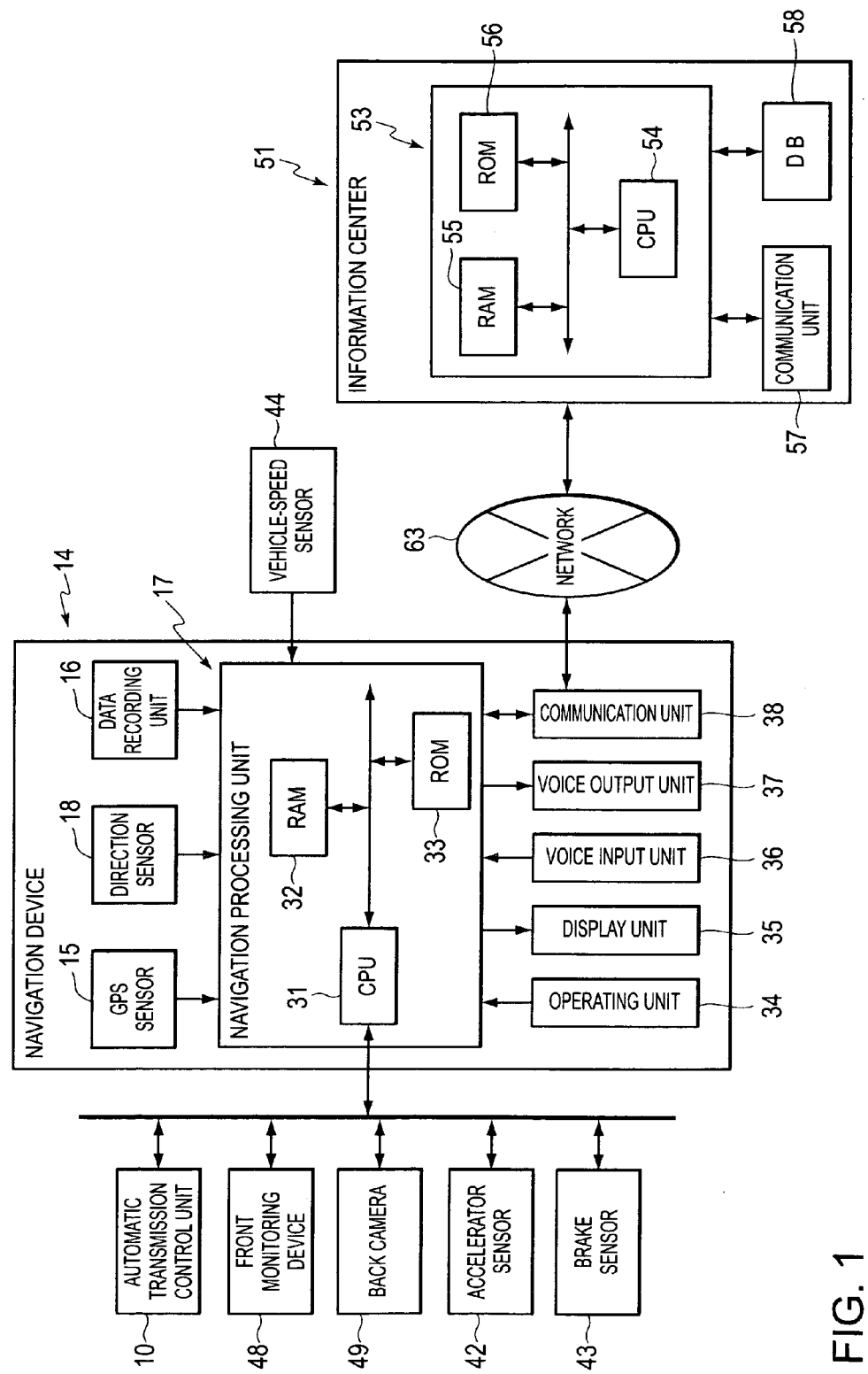
FIG. 1 is a block diagram showing an exemplary navigation system.

FIG. 1 is a diagram illustrating an exemplary navigation system.

In the drawing, reference numeral 10 denotes, for example, an automatic transmission control unit serving as a powertrain control unit. The automatic transmission control unit 10, for example, may control a powertrain with a predetermined transmission gear ratio, e.g., a continuously variable transmission (CVT) serving as an automatic transmission, a stepped transmission (automatic transmission), or an electrically-driven driving device.

Reference numeral 14, for example, may denote an information terminal, e.g., a navigation device serving as an in-vehicle navigation device; 63 may denote a network; and 51 may denote an information center serving as an informant. A navigation system may include, for example, an automatic transmission control unit 10, a navigation device 14, and a network.

The navigation device 14 may include, for example, a GPS sensor serving as a current location detection unit for detecting the current location of a vehicle, a memory (e.g., a data recording unit 16) serving as an information recording unit in which various types of information are recorded as well as map data, a controller (e.g., a navigation processing unit 17) for performing, for example, various types of calculation processing such as navigation processing, or the like, which may be based on input information, a direction sensor 18 serving as a direction detection unit for detecting the direction of a self-vehicle, an operating unit 34 serving as a first input unit for performing predetermined input by a driver serving as an operator performing operations, a display unit 35 serving as a first output unit for performing various types of display using an image displayed on an unshown screen to notify a driver, a voice input unit 36 serving as a second input unit for performing predetermined input using voice, a voice output unit 37 serving as a second output unit for performing various types of display using voice to notify the driver, and a communication unit 38 serving as a transmission/reception unit which functions as a communication terminal. The navigation processing unit 17 may be, for example, connected with the GPS sensor 15, data recording unit 16, directional sensor 18, operating unit 34, display unit 35, voice input unit 36, voice output unit 37, and communication unit 38.

The navigation processing unit 17 may also be, for example, connected with the automatic transmission control unit 10, a front monitoring device 48 attached to a predetermined place at the front end of the vehicle for monitoring the front of the vehicle, a back camera (backward monitoring camera) 49 attached to a predetermined place at the rear end of the vehicle and serving as an image capturing and monitoring device for the back of the vehicle, an accelerator sensor 42 serving as an engine load detection unit for detecting the operation of an accelerator pedal being actuated by the driver, a brake sensor 43 serving as a braking detection unit for detecting the operation of a brake pedal being actuated by the driver, a vehicle-speed sensor 44 for detecting a vehicle speed S, and so forth. Note that the accelerator sensor 42, brake sensor 43, and so forth may make up an operating information detection unit for detecting the operating information of the vehicle by the driver.

The GPS sensor 15 may detect, for example, the current location on the earth by receiving electric waves generated by a satellite, and may also detect the time. In an exemplary implementation, the GPS sensor 15 may be arranged so as to be used as a current-location detection unit; however a distance sensor, steering sensor, altimeter, and so forth can be used independently, or in combination instead of the GPS sensor 15. Also, for example, a gyro sensor, magnetic-field sensor, or the like can be used as the direction sensor 18. In an exemplary implementation, the direction sensor 18, vehicle-speed sensor 44, and so forth are provided; however, in the event of using a GPS sensor including a function for detecting vehicle direction, vehicle speed, and the like, the direction sensor 18, vehicle-speed sensor 44, and the like may be unnecessary.

The data recording unit 16 may include, for example, a map database made up of map data files whereby map data is recorded in the map database. The map data may include, for example, intersection data regarding intersections (branch points), node data regarding nodes, road data regarding road links, search data processed for searching, facility data regarding facilities, object feature data regarding object features on roads, and so forth.

The object features, for example, may be display objects installed or formed on roads for providing various types of information on driving to a driver, or performing various types of guidance on driving, and may include display lines, road signs, pedestrian crossings, manholes, traffic signals, and so forth. The display lines may include, for example, stop lines for stopping vehicles, vehicular lane borderlines for classifying each lane, compartment lines indicating parking spaces, and the like. The road signs may include, for example, traffic classification signs indicating the traveling direction of each lane using an arrow, and guidance signs for announcing a temporary stop point beforehand, such as "STOP" and the like, and so forth. The object feature data may include, for example, positional information wherein the position of each object feature is represented with coordinates or the like, image information wherein each object feature is represented with an image, and so forth. Note that the temporary stop point may include entrance points to a preferential road from a non-preferential road, railroad crossings, intersections where a red signal flashes, and so forth.

Additionally, the road data regarding lanes may include lane data serving as lane information and may include the number of lanes, lane numbers assigned for each lane on a road, lane positions, traffic classification signs indicating the traveling direction for each lane, and so forth. Data for outputting predetermined information using the voice output unit 37 may also be recorded in the data recording unit 16.

Further, with the data recording unit 16, a statistical database made up of statistical data files, a driving history database made up of driving history data files, and so forth may be formed. Statistical data is recorded, for example, in a statistical data file, and driving history data is recording, for example, in a driving history data file, either of which may be recorded as record data.

The statistical data may be, for example, a recorded of traffic information provided in the past, i.e., history information representing history, which may be created by using the traffic information provided in the past by an unshown road traffic information center, or the like, for example, the VICS (Vehicle Information and Communication System) center, which may serve as an informant by using road traffic census information which may serve to indicate traffic volume using the road traffic census information provided by the Ministry of Land, Infrastructure and Transport, the road time-table information provided by the Ministry of Land, Infrastructure and Transport, and so forth, independently, or in combination, and subjecting those to industrial process, and statistical processing as necessary. Note that the statistical data can be added, for example, with heavy traffic forecast information for forecasting heavy traffic situations, and so forth. In this case, when creating the statistical data, detailed conditions such as date and time, day of the week, weather, various types of event, season, information of facilities (existence of large-sized facilities such as a department store, supermarket, and so forth), and so forth may be added to the history information.

The data items of the statistical data may include, for example, a link number regarding each of road links, a direction flag indicating the direction of travel, an information classification indicating the type of information, the degree of heavy traffic for predetermined timing, link duration indicating duration for each predetermined timing when running on each of the road links, average data for every day of the week of the link duration (e.g., day-of-the-week average data), and so forth.

As used herein, the term link refers to, for example, a road or portion of a road. For example, according to one type of road data, each road may consist of a plurality of componential units called links. Each link may be separated and defined by, for example, an intersection, an intersection having more than three roads, a curve, and/or a point at which the road type changes.

Also, the driving history data, which may be collected by the information center 51 from multiple vehicles, i.e., a self-vehicle or the other vehicles, may be recorded information indicating the vehicle driving record for the roads where each respective vehicle ran, and is accumulated and calculated as probe data based on driving data. [Verify].

The data items of the driving history data may include, for example, link duration for each predetermined time while running on each of the road links, the degree of heavy traffic for each predetermined time while running on each of the road links, and the like. Note that the statistical data can be added to the driving history data. Also, with an exemplary implementation, the degree of heavy traffic maybe used as a heavy traffic index indicating the degree of heavy traffic, which may be classified into heavy traffic, congestion, and light traffic.

The data recording unit 16 may include unshown disks such as a hard disk, CD, DVD, optical disc, and so forth to record the various types of data, and also may include unshown heads such as read/write head for reading or writing various types of data, and the like. With the data recording unit 16, a memory card or the like may also be used. Note that each of the disks, memory card, or the like may make up an external storage device.

With an exemplary implementation, the map database, statistical database, driving history database, and so forth may be arranged to be formed in the data recording unit 16, but the map database, statistical database, driving history database, and the like may be formed in the information center 51.

Also, the navigation processing unit 17 may include, for example, a CPU 31 serving as a control device for controlling the entirety of the navigation device 14, and further serving as a computing device, RAM 32 which may be used as working memory when the CPU 31 performs various types of computing processing, ROM 33 in which various types of programs for recording various types of data, program, and so forth may be recorded as well as a control program, and an unshown flash memory which may be used to record various types of data, programs, and so forth. Note that the RAM 32, ROM 33, flash memory, and so forth may include an internal storage device.

Various types of programs can be recorded in the ROM 33, and various types of data can be recorded in the data recording unit 16, but the programs, data, and so forth can be recorded in a disk or the like. The programs, data, and so forth can be read out from the disk or the like to be written in the flash memory. Accordingly, the programs, data, and so forth can be updated by replacing the disk or the like. Also, the control program, data, and so forth of the automatic transmission control unit 10 can be recorded in the disk or the like. Further, the program, data, and so forth can be also received via the communication unit 38 to be written in the flash memory of the navigation processing unit 17.

The operating unit 34 may be for correcting the current location at the time of start of travel, inputting a departure location and a destination, inputting passing points, and/or activating the communication unit 38 by the driver operating the operating unit 34. A keyboard, mouse, and so forth, which may be disposed independently from the display unit 35, can also be used as the operating unit 34. Also, a touch panel which enables, for example, predetermined input operations by touching or clicking an image operating unit may be used whereby various types of keys, switches, buttons, or the like are displayed as images on the screen of the display unit 35, and can be used as the operating unit 34.

A display is used, for example, as the display unit 35. On various types of screens formed on the display unit 35, the direction of a vehicle can be displayed as a self-vehicle direction with the current location of a vehicle as a self-vehicle, a map, a searched route, guidance information along a searched route, traffic information, or the like can be displayed. Additionally, the display may indicate the distance up to the next intersection in the searched route, the progressive direction at the next intersection, information related to operating guidance, the operating menu, key guidance of the image operating unit, the operating unit 34, the voice input unit 36, an FM multiplex broadcast, and the like.

Also, the voice input unit 36 may include, for example, an unshown microphone, whereby necessary information can be input by voice. Further, the voice output unit 37 may include an unshown voice synthesizer, unshown speakers, the searched route, guidance information, traffic information, output from the voice output unit 37, for example, with voice synthesized by the voice synthesizer, or the like.

The communication unit 38 may include, for example, a beacon receiver for receiving various types of information such as the current traffic information, common information transmitted from the road traffic information center via an electric-wave beacon device, optical beacon device, or the like, disposed along a road as an electric-wave beacon, optical beacon, or the like, an FM receiver for receiving such information as an FM multiplex broadcast via an FM broadcasting station, and so forth. Note that the traffic information may include heavy traffic information, restriction information, parking information, traffic accident information, the congestion status information of a rest area, and so forth, and the common information may include news, weather forecast, and the like. Also, the beacon receiver and FM receiver may be arranged so as to be unitized and disposed as a VICS receiver, but can be disposed separately.

The traffic information may include, for example, an information classification indicating the classification of information, a mesh number for identifying mesh, a link number for pinpointing a road link connecting between two points (e.g., intersections) and indicating the classification of an up or down road, and link information indicating the content of the information to be provided corresponding to the link number. For example, in the event that the traffic information is heavy traffic information, the link information may include, for example, heavy traffic head data indicating the distance from the start point of the road link to the head of heavy traffic, the degree of heavy traffic, heavy traffic length indicating the distance from the head of the road link to the end of heavy traffic, link duration indicating duration necessary for traveling on the road link, and so forth.

The communication unit 38 can receive various types of information such as the traffic information, and common information, for example, the information center 51 via the network 63 as well as data such as the map data, statistical data, driving history data, and so forth.

Accordingly, the information center 51 may include, for example, a server 53, a communication unit 57 connected to the server 53, a database (DB) 58 serving as an information recording unit, and so forth. The server 53 may include a CPU 54 serving as a control device and as a computing device, RAM 55, ROM 56, and so forth. Also, the same data as the various types of data recorded in the data recording unit 16, e.g., the map data, statistical data, driving history data, and so forth may be recorded in the database 58. Further, the information center 51 can provide various types of information such as the current traffic information, common information, and so forth transmitted from various sources, for example, the road traffic information center, and from driving history data collected from multiple vehicles (self-vehicle and other vehicles) in real time.

The front monitoring device 48 may include a laser radar, a radar such as a millimeter-wave radar or the like, an ultrasonic sensor, or the like, or a combination of those, in order to monitor a preceding vehicle which is a vehicle traveling ahead, and/or in order to monitor temporary stop points and obstacles. Also, the front monitoring device 48 may detect relative speed indicating relative vehicle speed as to the preceding vehicle as the circumferential information of a vehicle, approach speed as to a temporary stop point, approach speed for obstacles, and so forth, and may further calculate the distance between vehicles, inter vehicle time, and the like.

The back camera 49 may be made up of a CCD device, which may be attached in a state in which the optical axis is directed diagonally downward in order to capture images behind the vehicle which may be other vehicles traveling behind the vehicle, buildings and structures on the road side, or the like, and designed to transmit the images to the CPU 31. The CPU 31 may read in the image data, and may recognize the respective photographed objects within the image as objects to be recognized by subjecting the image data to image processing. In an exemplary implementation, a CCD device is used as the back camera 49, but a CMOS device or the like can also be used.

Note that the navigation system, navigation processing unit 17, CPU 31, CPU 54, server 53, and so forth may, for example, serve as a computer by being used independently, or in combination of two or more, and perform computing processing based on various types of programs, data, and the like. Also, the data recording unit 16, RAM 32, RAM 55, ROM 33, ROM 56, database 58, flash memory, and so forth may make up a recording medium. An MPU or the like can be also used instead of the CPU 31 and CPU 54 as a computing device.

Next, a description will be made regarding the basic operation of the navigation system having the above configuration.

First, upon the operating unit 34 being operated by a driver activating the navigation device 14, the CPU 31 may initialize navigation, may read the current location of the vehicle detected by the GPS sensor 15, may detect the self-vehicle direction by the direction sensor 18, and may initialize various types of data. Next, the CPU 31 may perform matching, and may pinpoint the current location by determining, for example, whether the current location is positioned on a given road link based on the course of the current location, and the shapes and array of the respective road links making up the roads around the current location.

Also, the CPU 31 may pinpoint the current location based on the positions of the respective object features which are the photographed objects photographed by the back camera 49.

Accordingly, the CPU 31 may perform image recognition processing to collect image data from the back camera 49, and recognize the object features within the image made up of the image data. Also, the CPU 31 may perform distance calculation to calculate the distance from the back camera 49 to the actual object feature based on the position of the object feature within the image. Subsequently CPU 13 may perform current-location pinpointing processing to read in the distance, and also read out the planimetric data from the data recording unit 16 to obtain the coordinates of the object feature, and pinpoint the current location based on the obtained coordinates and distance.

Also, the CPU 31 may perform lane detection detect the driving lane where the vehicle is traveling by, for example, comparing the object feature recognized based on the image data with the object feature read out from the data recording unit 16 in the same way.

Note that the CPU 31 may read in the sensor output of the magnetic-field sensor, in order to determine whether there is a detected object made up of ferromagnetic material, such as a manhole or the like, on a predetermined lane on a road, whereby the driving lane can also be detected based on the result of such a determination. Further, the current location may be detected by using a high-precision GPS sensor 15, whereby the current location can be detected precisely and the driving lane can be detected based on the detection result. Also, at the same time when subjecting the image data of display lines to image processing, the sensor output of the magnetic-field sensor, the current location, and so forth may be combined as necessary, whereby the driving lane can be detected.

Subsequently, the CPU 31 may obtain basic information such as the map data by reading, for example, the map data from the data recording unit 16, or by receiving the map data from the information center 51, or the like, via the communication unit 38. Note that in the event of obtaining the map data from the information center 51 or the like, the CPU 31 may download the received map data to the flash memory.

Subsequently, the CPU 31 may display various types of screens on the display unit 35. For example, the CPU 31 may perform map display to form a map screen on the display unit 35, and display the surrounding map on the map screen, and also display the direction of a vehicle as a self-vehicle direction with the current location which is the self-vehicle location.

Accordingly, the driver can, for example, drive the vehicle in accordance with the map, the self-vehicle location, and/or the vehicle direction.

Also, upon the driver operating the operating unit 34 to input a destination, the CPU 31 may perform destination setting to set a destination. Note that a departure location can be input and set as necessary. Also, a predetermined point can be registered beforehand, and the registered point can be set as a destination. Subsequently, upon the driver operating the operating unit 34 to input searching conditions, the CPU 31 may set searching conditions.

Thus, upon the destination and searching conditions being set, the CPU 31 may perform route-searching to read in the current location, destination, searching conditions, and so forth, and also read out the search data and the like from the data recording unit 16, search the route from the departure location represented with the current location to the destination using the searching conditions based on the current location, destination, and search data, and output the route data so as to indicate a searched route. At this time, the route wherein the sum of the link costs is the smallest may be taken as a searched route. In determining the sum of the costs, a link cost may be needed for each link.

Also, in the event that a road on which multiple lanes are formed is included in the searched route, the CPU 31 may, for example, search the searched route for each lane regarding the above road. Accordingly, with regard to a road on which multiple lanes are formed, the lane number and so forth of the driving lane may be included in the route data.

Note that route searching can be performed, for example, at the information center 51. In this case, the CPU 31 may transmit the current location, destination, searching conditions, and so forth to the information center 51. Upon the information center 51 receiving the current location, destination, searching conditions, and so forth, the CPU 54 may perform the same route-searching processing as the CPU 31 to read out the search data from the data base 58, search the route from the departure location to the destination based on the current location, destination, and search data, and output route data indicating a searched route. Subsequently, the CPU 54 may transmit the route data to the navigation device 14.

Based on the transmitted route data, the CPU 31 may perform route guidance. Accordingly, the route display CPU 31 may read in the route data, and may display the searched route on the map screen in accordance with the route data.

In the event that a road on which multiple lanes are formed is included in the searched route, lane guidance may be arranged so as to be performed. Therefore, the CPU 31 may perform recommended-lane calculations to read in the searched route, to read out intersection data, to read lane information, and the like, and to calculate the recommended lane in each of the roads on the searched route based on the searched route, intersection data, lane information, and so forth. Subsequently, the CPU 31 may, for example, form a lane guidance map on a predetermined area of a map screen, display the recommended lane on the lane guidance map, and guide the vehicle from the driving lane to the recommended lane.

Incidentally, with route guidance, in the event that it is necessary to turn the vehicle to the left or right at a predetermined intersection, the intersection may be set as a guiding point, and also as a guidance intersection. Therefore, the CPU 31 may perform guidance-intersection setting to determine whether or not there is an intersection where it is necessary to turn the vehicle to the left or right in accordance with the route data, i.e., based on the searched route, and in the event that there is an intersection where it is necessary to turn the vehicle to the left or right, this intersection may be set as a guidance intersection.

Subsequently, the CPU 31 may, for example, form an enlarged view of the intersection, i.e., to generate an intersection enlarged view serving as a guidance point enlarged view on a predetermined area of the map screen before the vehicle reaches a guidance intersection, and may perform route guidance using the intersection enlarged view. Therefore, a guidance-point enlarged view display point may be set at a point apart only a predetermined distance before the guidance intersection on the searched route, and upon the vehicle reaching the guidance-point enlarged view display point, the intersection enlarged view is displayed. Note that with a toll road only for vehicles such as a highway, an urban expressway, and so forth, an intersection which merges or branches onto or from a junction or the like may also be set as a guidance intersection.

Subsequently, in the event that multiple lanes are formed on an entrance road to a guidance intersection or a road exiting from a guidance intersection (hereinafter "exiting road"), the CPU 31 may display the lane wherein route guidance is performed on the intersection enlarged view, and may perform lane guidance. In this case, the surrounding map of the guidance intersection, searched route, and landmarks, such as facilities which become marks in the guidance intersection, may be displayed on the intersection enlarged view.

Subsequently, the CPU 31 may set one or more multiple route guidance points at points which may be apart only by a predetermined distance before the guidance intersection on the searched route, and whereby the voice output processing means of the guidance processing means may perform voice output processing upon the vehicle reaching each of the route guidance points. The route guidance may include predetermined content for each route guidance point regarding the upcoming intersection. Voice output may be performed by the voice output unit 37. Note that the guidance point enlarged view display point wherein the intersection enlarged view is displayed, and one of the respective route guidance points, e.g., the first route guidance point can be set as the same point.

Subsequently, in the event that multiple lanes are formed on an entrance road to the guidance intersection, or a road exiting from the guidance intersection, lane guidance regarding the guidance intersection is performed, a predetermined lane may be recommended as the recommended lane, and the vehicle may be arranged so as to be guided from the driving lane to the recommended lane. However, even with a guidance intersection involving a situation in which a vehicle can readily pass through and it is unnecessary to perform lane guidance, route guidance may become complicated.

Accordingly, regarding a guidance intersection, a driver can readily select an appropriate lane, i.e., can readily perform lane planning at an entrance road or exiting road in the absence of lane guidance in the event that predetermined route guidance simplification conditions are satisfied, such that even though the vehicle reaches a route guidance point, lane guidance by voice is not performed. Therefore, the CPU 31 may perform determination of a guidance intersection by classifying, for example, various types of guidance intersections. In other words, the CPU 31 may regard a guidance intersection wherein lane planning cannot be readily performed as a first class of guidance intersection, and regard a guidance intersection wherein lane planning can be readily performed as a second class of guidance intersection.

Figure 2:
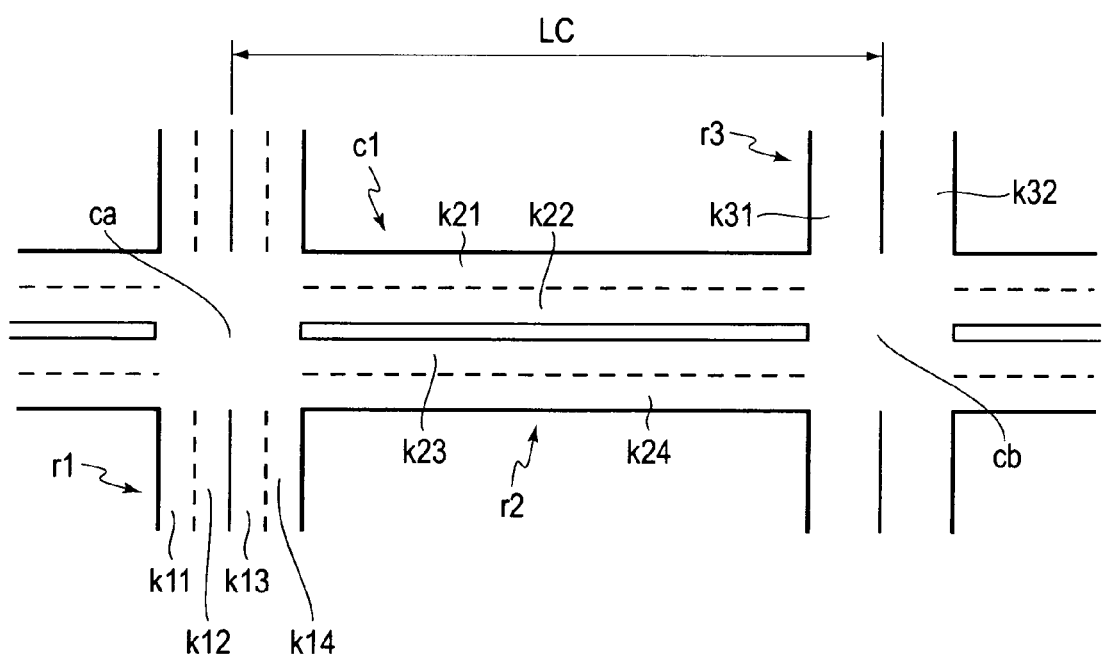
FIG. 2 is an explanatory diagram depicting an exemplary guidance intersection.
Figure 3:
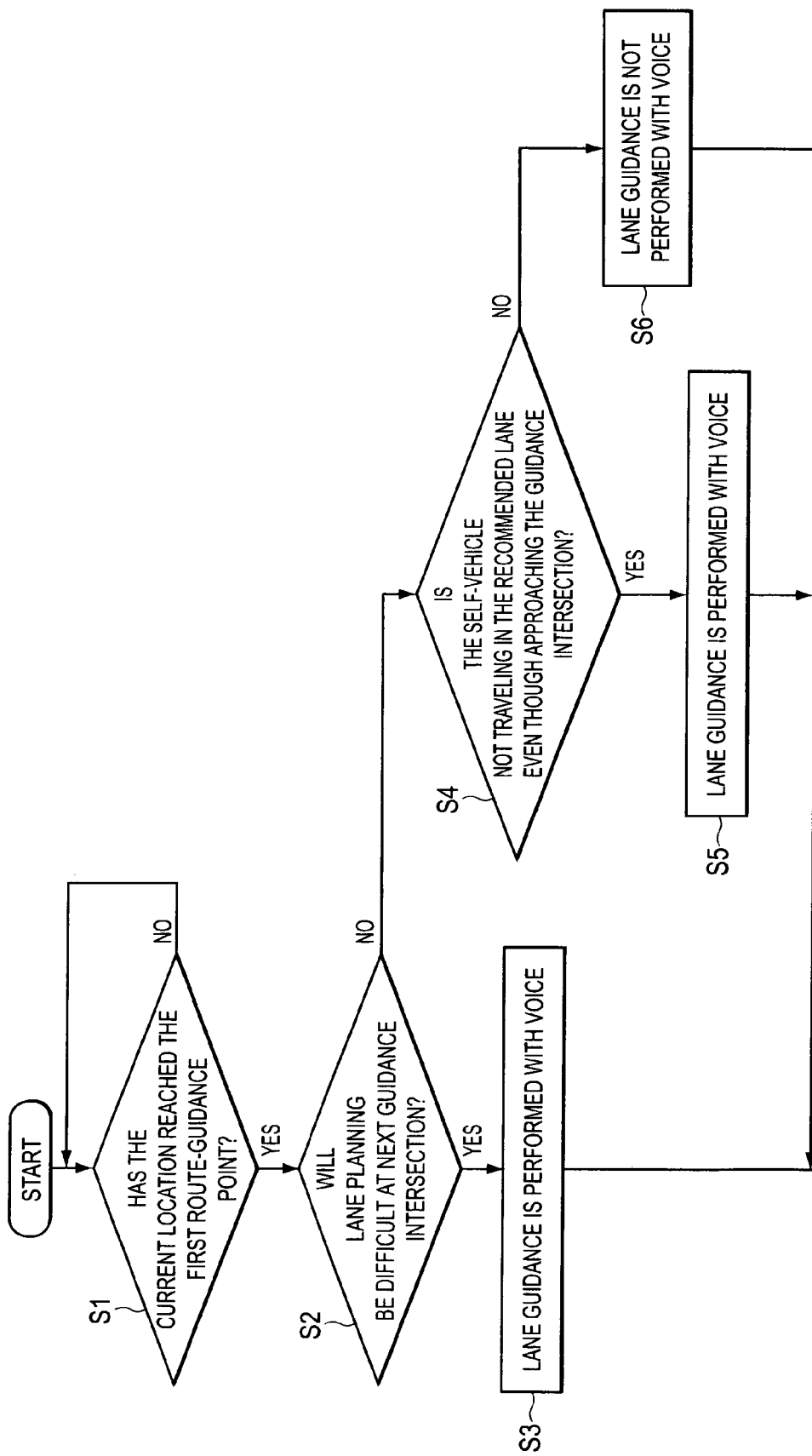
FIG. 3 is a flowchart illustrating an exemplary guidance method.

FIG. 2 is an explanatory diagram for classifying exemplary guidance intersections, and FIG. 3 is a flowchart illustrating an exemplary operation of assisted guidance. The exemplary method may be implemented, for example, by one or more components of the above-described navigation system. However, even though the exemplary structure of the above-described navigation system may be referenced in the description, it should be appreciated that the structure is exemplary and the exemplary method need not be limited by any of the above-described exemplary structure.

In the drawings, r1 through r3 denote roads, c1 is a guidance intersection where the roads r1 and r2 intersect, and also the roads r2 and r3 intersect, and the guidance intersection c1 includes continuous intersections ca and cb, whereby the roads r1 and r2 intersect at the intersection ca, and the roads r2 and r3 intersect at the intersection cb.

Also, k11 through k14 are the lanes of the road r1, k21 through k24 are the lanes of the road r2, and k31 and k32 are the lanes of the road r3.

First, in the event that the vehicle is traveling on the road r1 where the lanes k11 and k12 are formed, and turns to the right at the intersection ca, the CPU 31 may determine whether or not a first condition holds depending on whether or not a predetermined lane, the rightmost lane k12 with the present implementation may be set to the recommended lane, and in the event that the rightmost lane k12 is not set to the recommended lane, a determination may be made that the first condition holds, and in the event that the rightmost lane k12 is set to the recommended lane, a determination may be made that the first condition does not hold. Also, in the event that the vehicle is traveling on the road r1, and turns to the left at the intersection ca, the CPU 31 may determine whether or not a second condition holds depending on whether or not the leftmost lane k11 is set to the recommended lane, and in the event that the leftmost lane k11 is not set to the recommended lane, a determination may be made that the second condition holds, and in the event that the leftmost lane k11 is set to the recommended lane, a determination may be made that the second condition does not hold.

Further, the CPU 31 may determine whether or not a third condition holds depending on the vicinity of the intersection c1, e.g., the recommended lane changes within a range of a predetermined distance from the guidance intersection c1, and in the event that the recommended lane changes, a determination may be made that the third condition holds, and in the event that the recommended lane does not change, a determination may be made that the third condition does not hold.

Subsequently, the CPU 31 may determine whether or not a fourth condition holds depending on whether or not between the intersections ca and cb, the distance where the vehicle can move between lanes, i.e., a movable distance between lanes Lx is shorter than the minimum distance necessary for moving between lanes from the driving lane to the recommended lane (i.e., the minimum required distance Lmin). In the event that the movable distance between lanes Lx is shorter than the minimum required distance Lmin, a determination may be made that the fourth condition holds, and in the event that the movable distance between lanes Lx is equal to or longer than the minimum required distance Lmin, a determination may be made that the fourth condition does not hold.

Note that in the event that a zone where movement between lanes is prohibited, i.e., a lane change prohibition zone does not exist between the respective intersections ca and cb, the movable distance between lanes Lx may be arranged so as to become equal to the distance between the respective intersections ca and cb, and the distance Lc between centers of the respective intersections ca and cb, but in the event that the lane change prohibition zone exists between the respective intersections ca and cb, the movable distance between lanes Lx becomes equal to the distance obtained by subtracting the distance L2 of the movable distance between lanes from the distance Lc.

For example, when the vehicle is traveling on the road r1 to enter the guidance intersection c1, turns to the right at the intersection ca to exit to the road r2, subsequently, enters the intersection cb, and turns to the left at the intersection cb to exit to the road r3, and in the event that there is no lane change prohibition zone between the respective intersections ca and cb, the vehicle can turn to the right at the intersection ca to exit to the lane k22, following which the vehicle can then move to the lane k21 at an arbitrary location, and enter the intersection cb. In this case, the movable distance between lanes Lx may be arranged so as to become equal to the distance Lc between the respective intersections ca and cb.

Alternatively, in the event that there is a lane change prohibition zone between the respective intersections ca and cb, the vehicle may turn to the right to exit to the lane k22, following which it may move to the lane k21 at a location other than the lane change prohibition zone, and enter the intersection cb. In this case, the movable distance between lanes Lx may be arranged so as to become equal to the distance obtained by subtracting the distance L2 of the movable distance between lanes from the distance Lc between the respective intersections ca and cb. Note that in the event that the vehicle cannot turn to the left at the intersection cb, the CPU 31 may not perform a determination of whether or not the fourth condition holds.

Incidentally, when assuming that vehicle speed at the time of route guidance being performed, and moving between lanes is $va=30$ km/h, and time necessary for outputting route guidance by voice is $\tau 1=2$ sec, distance L1 over which a vehicle travels during route guidance being performed is $L1 \approx 17$ m, when assuming that the shortest time per one lane necessary at the time of moving between lanes is $Tq=15$ sec, and the number of movement of lanes from the driving lane to the recommended lane is N, following route guidance being performed, distance L2 over which the vehicle travels during movement between lanes is $L2 \approx 125 \times N$ m.

Accordingly, the minimum required distance Lmin is set as follows:

$L\min=17+125 \times N$ m.

Thus, upon determining whether or not the first through fourth conditions hold, the CPU 31 may determine whether or not at least one condition of the first through fourth conditions holds. Subsequently, in the event that at least one condition of the first through fourth conditions holds, the CPU 31 may regard the guidance intersection as the first class of guidance intersection, and in the event that none of the first through fourth conditions holds, the CPU 31 may regard the guidance intersection as the second class of guidance intersection.

Subsequently, the CPU 31 may perform route-guidance determining to read in whether the guidance intersection c1 belongs to either of the first class or second class of guidance intersection at the time of performing lane guidance and may determine whether or not route guidance simplification conditions hold. In the event that the guidance intersection c1 belongs to the first class of guidance intersection, a determination may be made that the route guidance simplification conditions do not hold, and the CPU 31 may perform ordinary processing to perform lane guidance at each of the route guidance points by ordinary voice. Also, in the event that the guidance intersection c1 belongs to the second class of guidance intersection, a determination may be made that the route guidance simplification conditions hold, and CPU 31 may perform simplification processing to perform lane guidance by voice in a simplified manner. That is to say, of the respective route guidance points, at the first route guidance point, lane guidance by voice may not be not performed. Also, when the vehicle reaches the second route guidance point, e.g., the intermediate route guidance point, or an immediately preceding route guidance point, the CPU 31 may read in the driving lane and the recommended lane, and may determine whether or not the vehicle is traveling in the recommended lane, and in the event that the vehicle is traveling in the recommended lane, the CPU 31 may skip lane guidance by voice, and in the event that the vehicle is not traveling in the recommended lane, the CPU 31 may perform lane guidance by voice. That is to say, even though the vehicle approaches the guidance intersection c1, only in the event that the vehicle has not entered the recommended lane, the CPU 31 may perform lane guidance by voice.

Thus, determination may be made as to whether or not the route guidance simplification conditions hold, and in the event that the route guidance simplification conditions hold, lane guidance by voice may be simplified, whereby route guidance can be simplified.

Next, a description will be made regarding the flowchart.

Step S1: Standby for the vehicle to reach the first route guidance point, and in the event of reaching the first route, the flow may proceed to Step S2.

Step S2: Determine whether or not lane planning can be readily performed at the next guidance intersection. In the event that lane planning cannot be readily performed, the flow may proceed to Step S3, and in the event that lane planning can be readily performed, the flow may proceed to Step S4.

Step S3: Perform lane guidance by voice, and end the processing.

Step S4: Determine whether or not the vehicle is not traveling in the recommended lane even though approaching the guidance intersection. In the event that the vehicle is not traveling in the recommended lane even though approaching the guidance intersection, the flow may proceed to Step S5, and in the event of traveling in the recommended lane, the flow may proceed to Step S6.

Step S5: Perform lane guidance by voice, and end the processing.

Step S6: Perform no lane guidance by voice, and end the processing.

Next, a description is made regarding the case of performing lane guidance by voice at a typical guidance intersection using ordinary processing.

Figure 4:
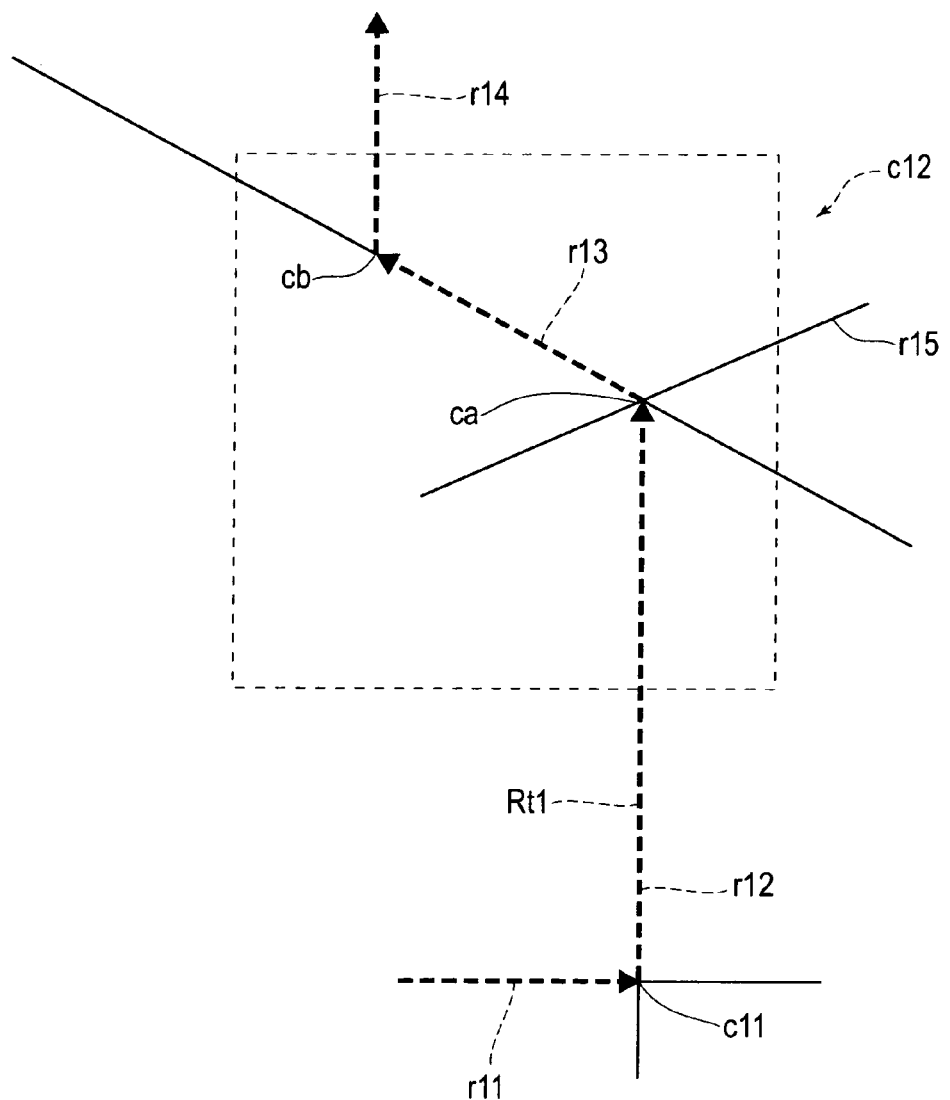
FIG. 4 is a conceptual diagram illustrating an exemplary guidance intersection
Figure 5:
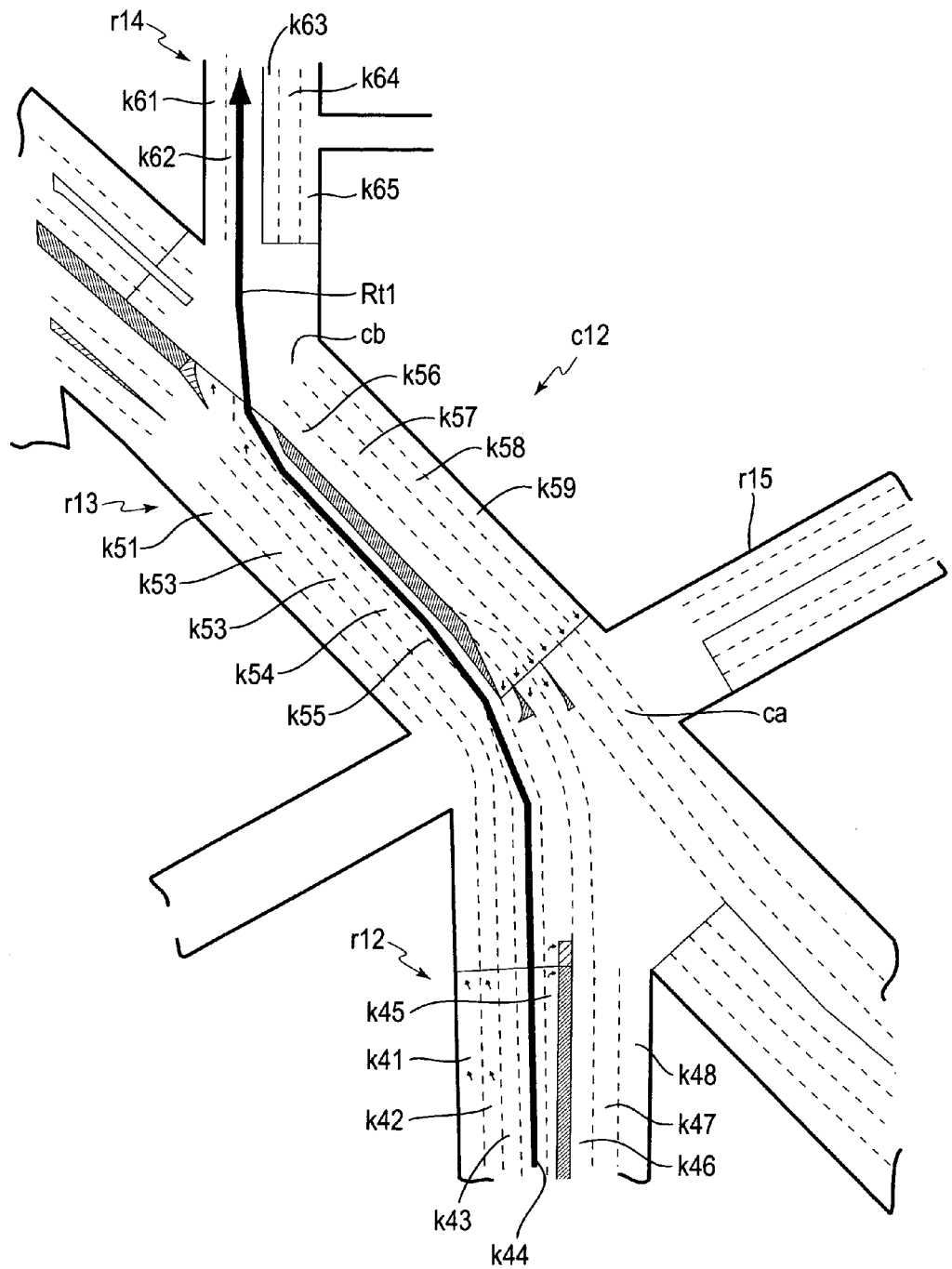
FIG. 5 is a detailed diagram illustrating an exemplary guidance intersection.
Figure 6:
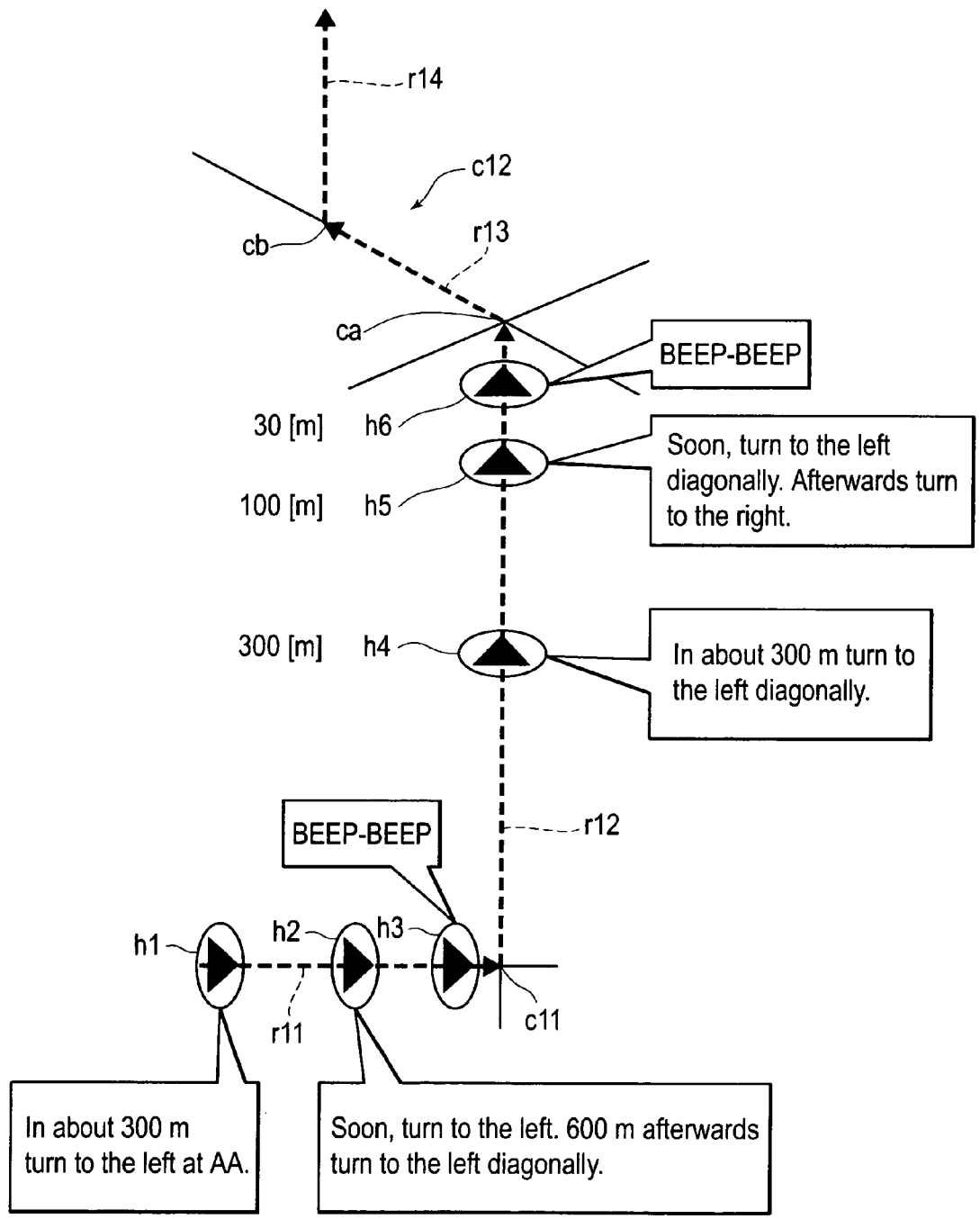
FIG. 6 is a reference diagram involving an exemplary guidance intersection.
Figure 7:
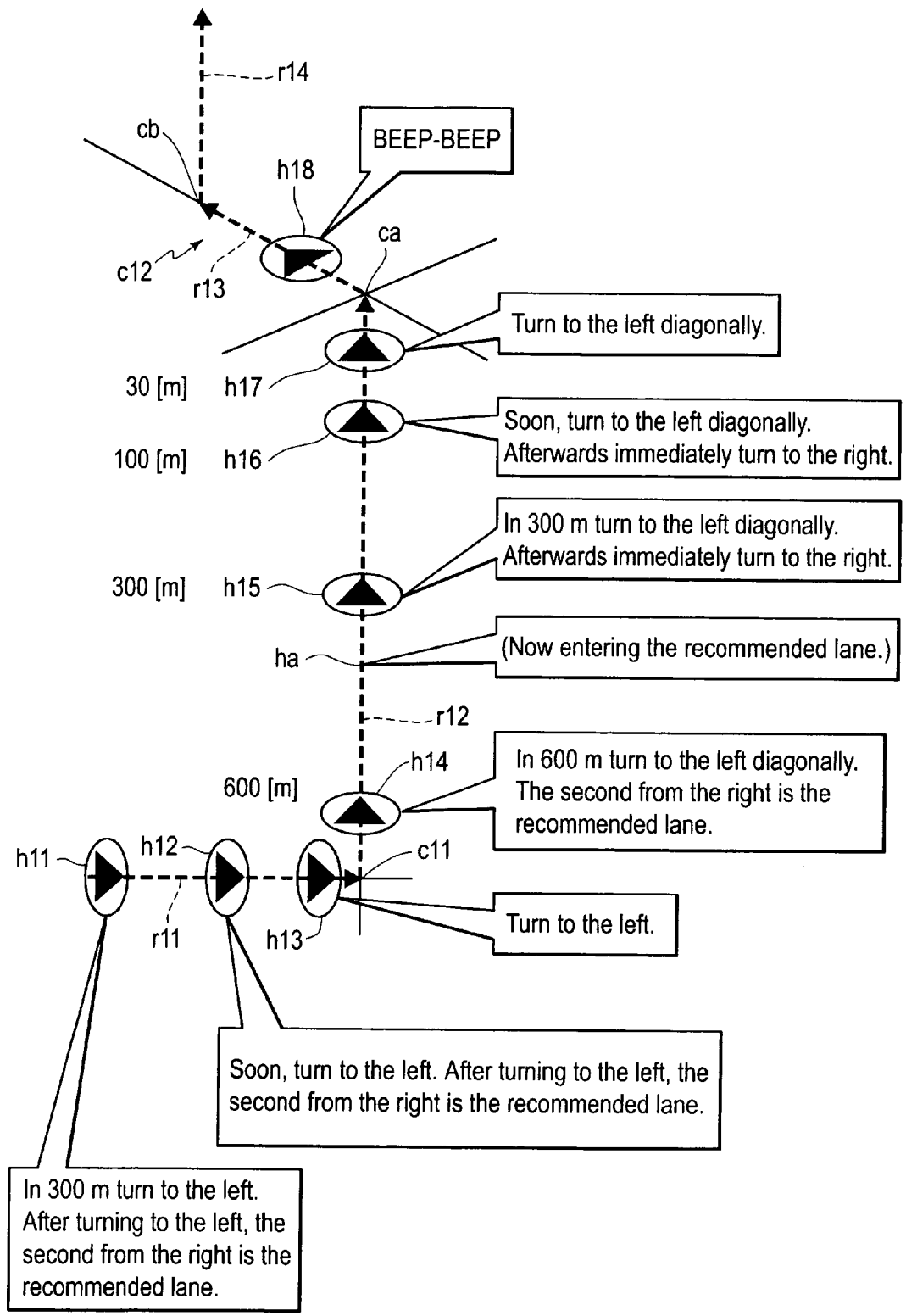
FIG. 7 is a separate diagram illustrating an exemplary guidance intersection.

FIG. 4 is a conceptual diagram illustrating a guidance intersection according to an exemplary implementation of the present invention, FIG. 5 is a detailed diagram illustrating the first exemplary guidance intersection, FIG. 6 is a reference diagram of lane guidance regarding the first exemplary guidance intersection, and FIG. 7 is a diagram illustrating lane guidance regarding the first exemplary guidance intersection.

In the drawings, r11 through r15 denote roads, c11 denotes the guidance intersection where the roads r11 and r12 intersect, c12 denotes the guidance intersection where the roads r12, r13, and r15 intersect, and also the roads r13 and r14 intersect, the guidance intersection c12 includes continuous intersections ca and cb, the roads r12, r13, and r15 intersect at the intersection ca, and the roads r13 and r14 intersect at the intersection cb. Rt1 is a searched route. The searched route Rt1 is arranged so as to pass through the roads r11 through r14 in order, turn to the left at the guidance intersection c11, merge onto the road r13 at the guidance intersection c12, and finally turn to the right.

Lanes k41 through k48 are formed on the road r12, lanes k51 through k59 on the road r13, and lanes k61 through k65 on the road r14. The lanes k45, k54, and k55 are right-turn dedicated lanes. In the event of driving a vehicle along the searched route Rt1, the vehicle turns to the left at the guidance intersection c11 to enter the road r12, then merges onto the road r1 at the intersection ca of the guidance intersection c12, and then turns to the right at the intersection cb.

At this time, the CPU 31 may, for example, need to turn to the right at the intersection cb, so the lane k55 may be set to the recommended lane before the intersection cb, and in order to turn to the left at the intersection ca to exit to the lane k55, the lane k44 may be set to the recommended lane before the intersection ca. In this case, when turning to the left at the intersection ca, the leftmost lane k41 may not be set to the recommended lane, so that the first condition holds, a determination may be made that the guidance intersection 12 belongs to the first class of guidance intersection, and the route-guidance determining processing means may determine that the route guidance simplification conditions do not hold. Consequently, the CPU 31 may perform lane guidance by voice at the respective route guidance points.

Note that when traveling along the searched route Rt1, in the event that lane guidance is not performed, as illustrated in FIG. 6, route guidance points h1 through h3 may be set before the guidance intersection c11, and route guidance points h4 through h6 may be set at the points of 300 m, 100 m, and 30 m before the guidance intersection c12.

Subsequently, during traveling on the road r11, the message of "In about 300 m turn to the left at AA." or the like may be output by voice at the route guidance point h1, the message of "Soon, turn to the left. 600 m after that turn to the left diagonally." or the like at the route guidance point h2, and an advice sound (beep-beep) may indicate just before the guidance intersection c11 at the route guidance point h3.

Also, during traveling on the road r12, the message of "In about 300 m turn to the left diagonally." or the like may be output by voice at the route guidance point h4, the message of "Soon, turn to the left diagonally. Turn to the right after that." or the like at the route guidance point h5, and an advice sound (beep-beep) may indicate just before the intersection ca at the route guidance point h6.

Alternatively, in the event of performing lane guidance, as illustrated in FIG. 7, route guidance points h11 through h13 may be set before the guidance intersection c11, route guidance points h14 through h17 may be set at the points of 600 m, 300 m, 100 m, and 30 m before the guidance intersection c12, and route guidance point h18 may be set between the intersections ca and cb. Note that a route guidance point ha may be set between the route guidance points h14 and h15.

Subsequently, during traveling on the road r11, the message of "In 300 m turn to the left. Following turning to the left, the second from the right is the recommended lane" or the like may be output by voice at the route guidance point h11, the message of "Soon, turn to the left. Following turning to the left, the second from the right is the recommended lane" or the like at the route guidance point h12, and the message of "Turn to the left" or the like at the route guidance point h13.

Also, during traveling on the road r12, the message of "In 600 m turn to the left diagonally. Following turning to the left, the second from the right is the recommended lane" or the like may be output by voice at the route guidance point h14, the message of "In 300 m turn to the left diagonally. Afterwards immediately turn to the right" or the like at the route guidance point h15, the message of "Soon, turn to the left diagonally. Afterwards immediately turn to the right" or the like at the route guidance point h16, and the message of "Turn to the left diagonally" or the like at the route guidance point h17.

Note that the route guidance point ha may be set at an arbitrary point from the intersection c11 to the intersection ca between the route guidance points h14 and h15, and the message of "Now entering the recommended lane" or the like may be output by voice at the route guidance point ha.

Further, during traveling on the road r13, an advice sound (beep-beep) may indicate just before the intersection cb is output by voice at the route guidance point h18.

Next, a description is made regarding the case of performing lane guidance by voice at another exemplary guidance intersection.

Figure 8:
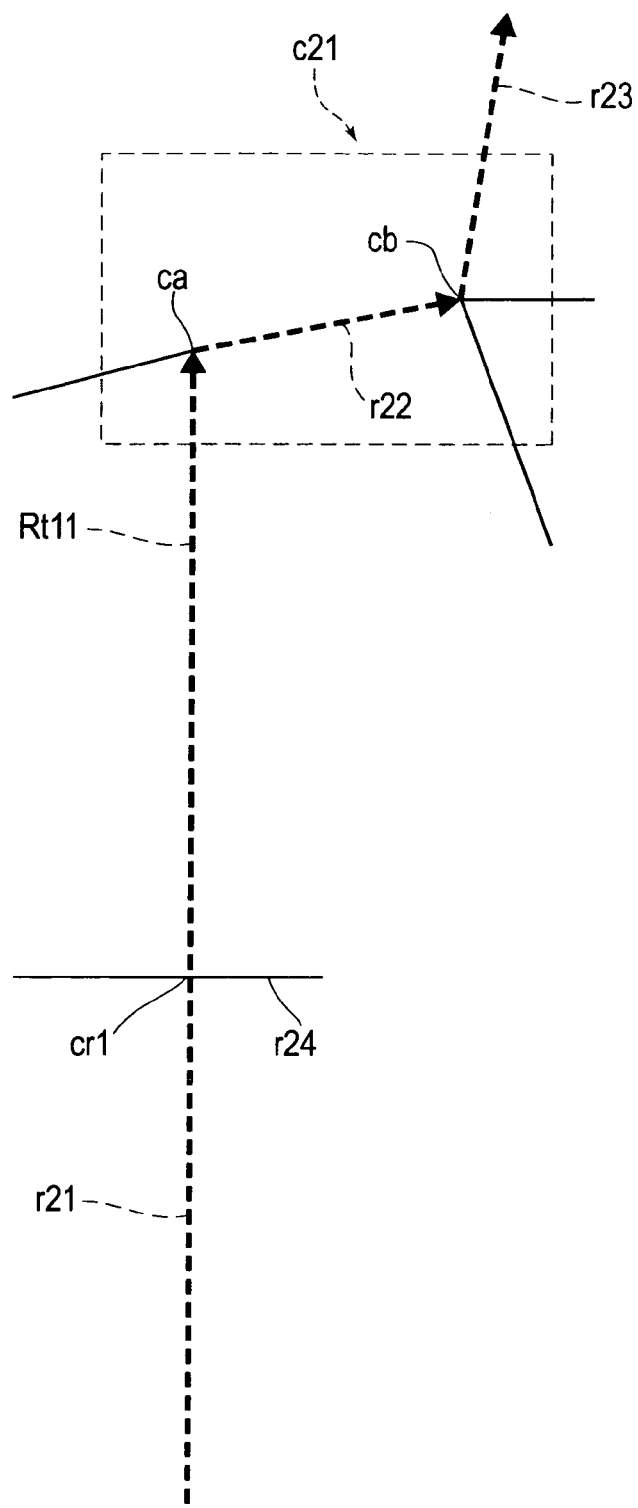
FIG. 8 is a conceptual diagram illustrating an exemplary guidance intersection.
Figure 9:
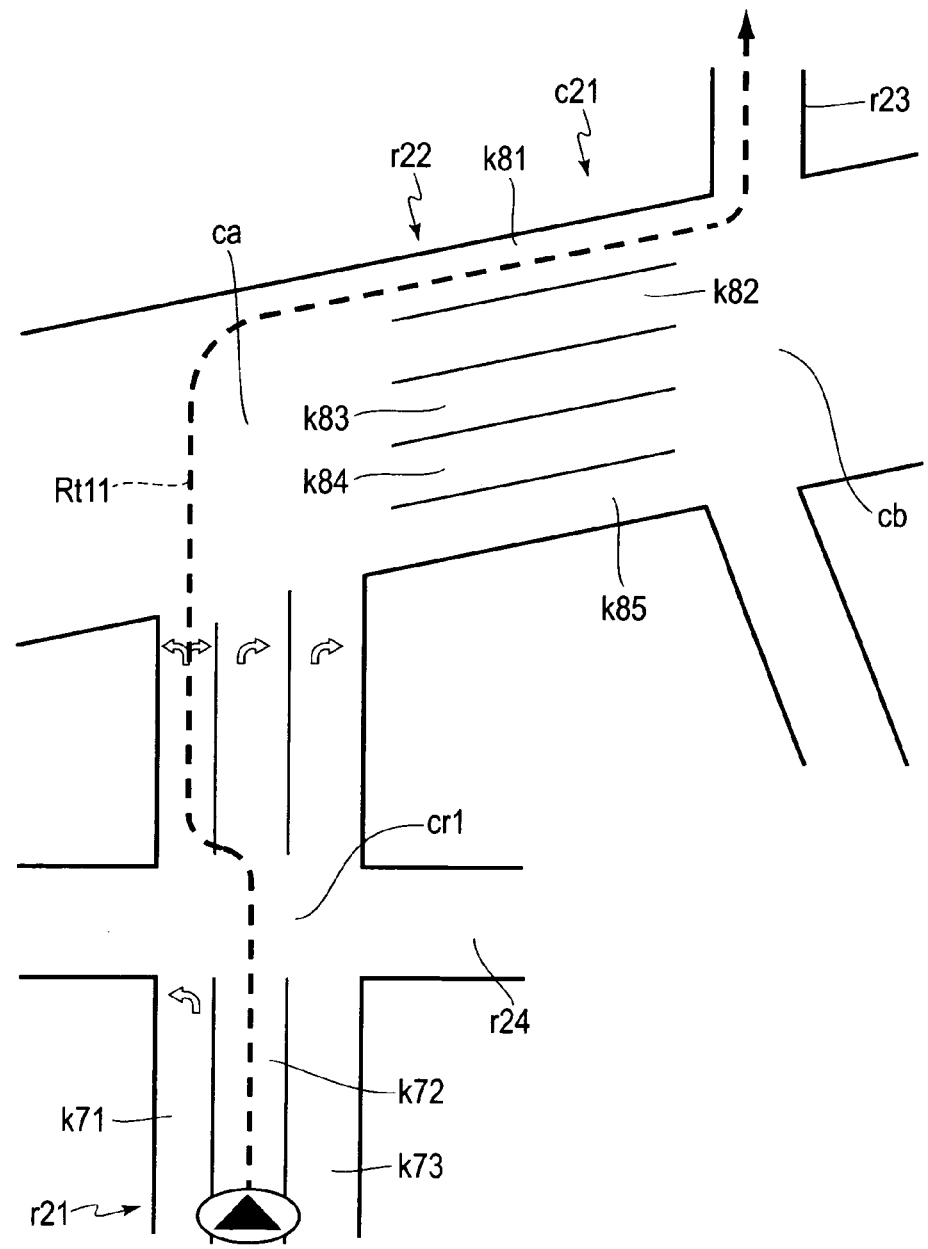
FIG. 9 is a detailed diagram illustrating an exemplary guidance intersection.
Figure 10:
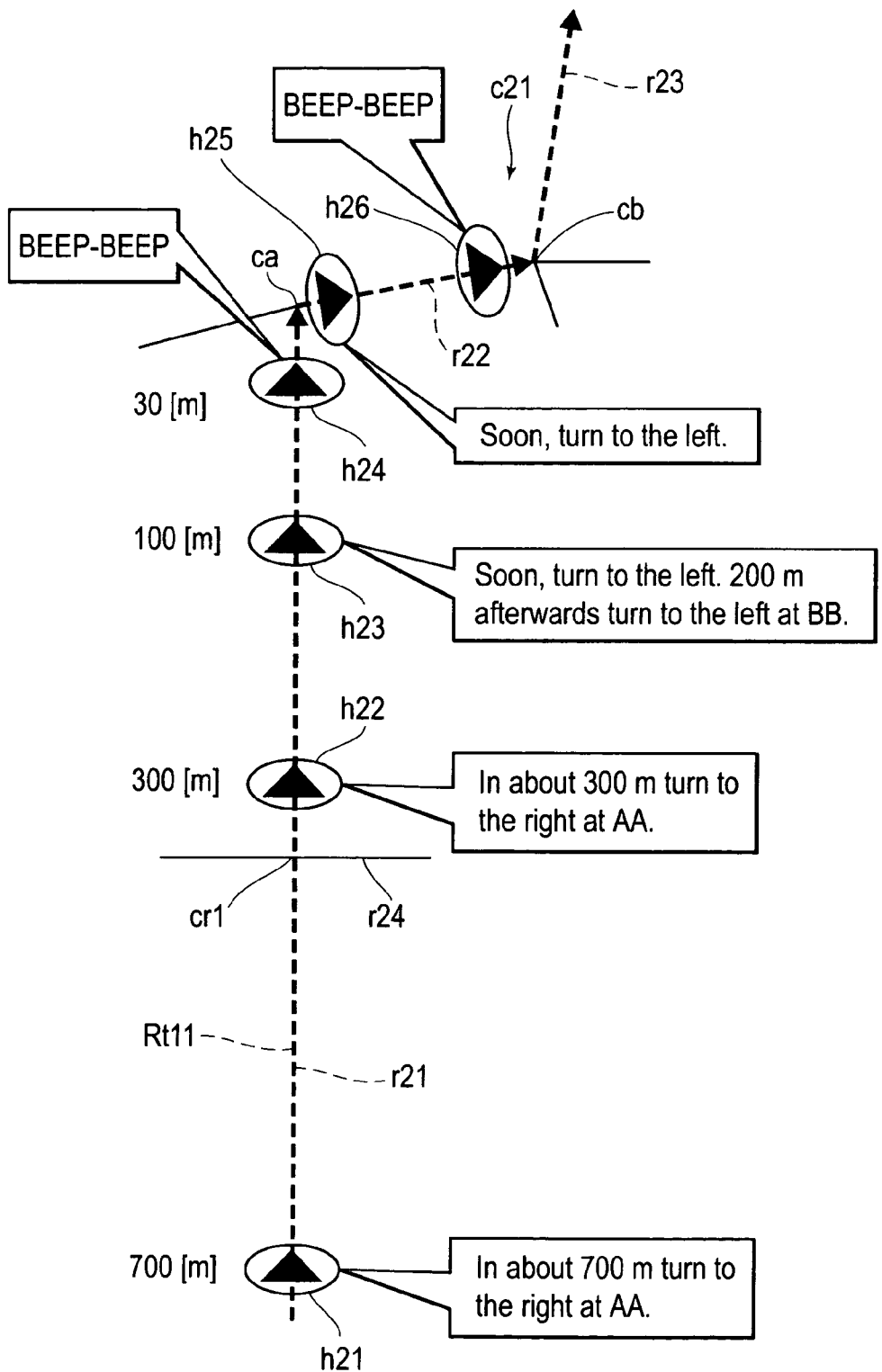
FIG. 10 is a reference diagram involving an exemplary guidance intersection.
Figure 11:
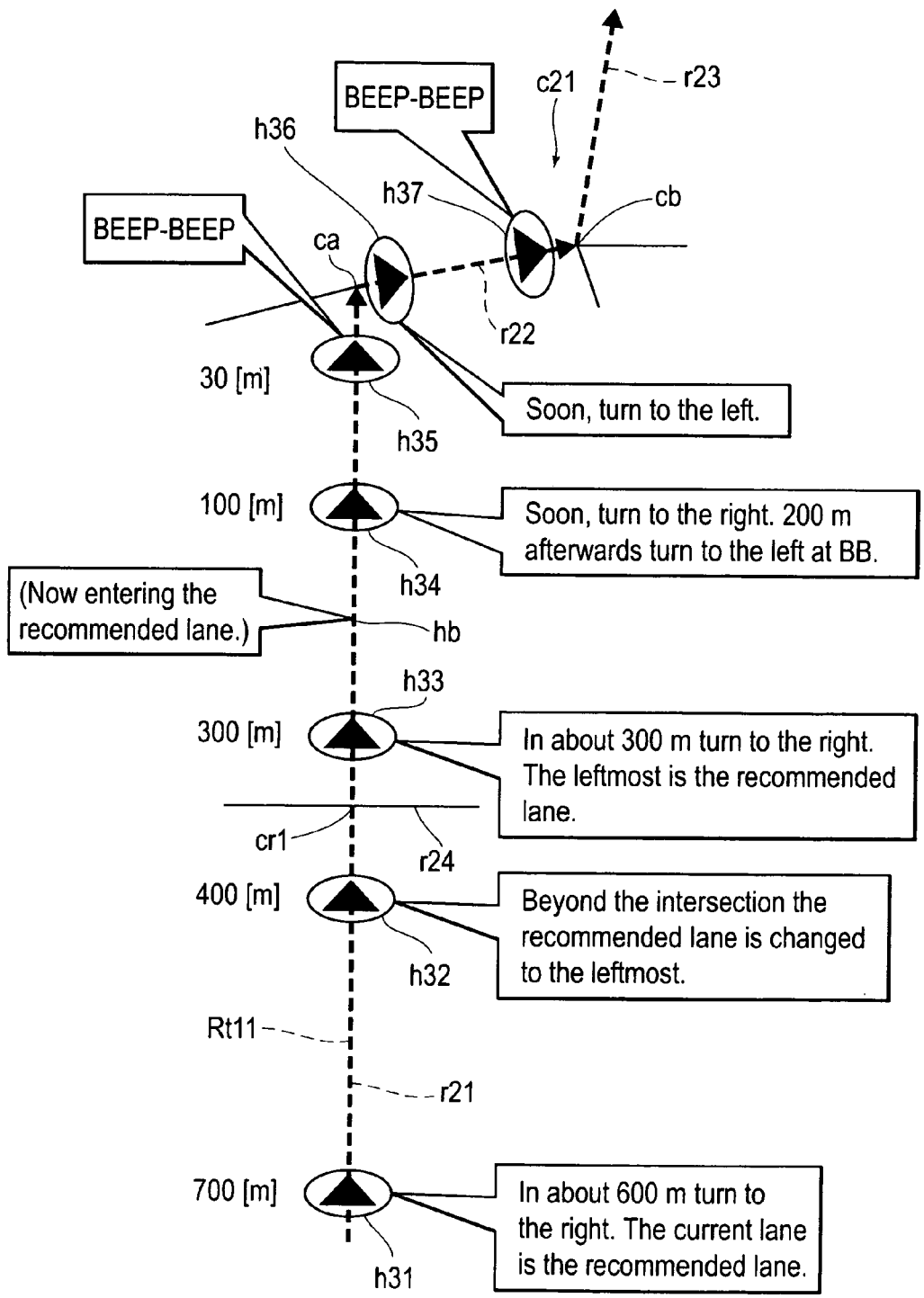
FIG. 11 is a reference diagram involving an exemplary guidance intersection.

FIG. 8 is a conceptual diagram illustrating a second exemplary guidance intersection, FIG. 9 is a detailed diagram illustrating the second exemplary guidance intersection, FIG. 10 is a reference diagram of lane guidance regarding an exemplary guidance intersection, and FIG. 11 is another diagram illustrating lane guidance regarding an exemplary guidance intersection.

In the drawings, r21 through r24 denote roads, cr1 denotes the intersection where the roads r21 and r24 intersect, c21 denotes the guidance intersection where the roads r21 and r22 intersect, and also the roads r22 and r23 intersect, the guidance intersection c21 includes an intersection ca where the roads r21 and r22 intersect, and a intersection cb where the roads r22 and r23 intersect. Rt11 is a searched route. The searched route Rt11 is arranged so as to pass through the roads r21 through r23 in order, and with the guidance intersection c21, turn to the right at the intersection ca, and then immediately turn to the left at the intersection cb.

Lanes k71 through k73 are formed on the road r21, and lanes k81 through k85 on the road r22. Before the intersection cr1, the lane k71 is a left-turn dedicated lane, and before the intersection ca of the guidance intersection c21, the lane k71 is a lane which can turn to the right or left, and the lanes k72 and k73 are right-turn dedicated lanes. In the event of driving a vehicle along the searched route Rt11, the vehicle passes through the intersection cr1, then with the guidance intersection c21, turns to the right at the intersection ca to enter the road r22, and subsequently turns to the left at the intersection cb. At this time, with the road r21, the lane k71 before the intersection cr1 is the left-turn dedicated lane, so the lane k72 is set to the recommended lane. Also, before the intersection ca of the guidance intersection c21, the lane k71 can turn to the right or left, and the lanes k72 and k73 are right-turn dedicated lanes, but the vehicle turns to the left at the intersection cb, so the lane k81 is set to the recommended lane on the road r22, the lane k71 before the intersection ca is set to the recommended lane on the road r21, and also the lane k72 before the intersection cr1 is set to the recommended lane.

In this case, in the event that the vehicle is traveling on the road r21 on which the lanes k71 through k73 are formed, turns to the right at the intersection ca of the guidance intersection c21, and then turns to the left at the intersection cb, the rightmost lane k73 on the road r21 is a right-turn dedicated lane at the intersection ca, but may not be set to the recommended lane. Accordingly, the CPU 31 may determine that the first condition holds, and the guidance intersection c21 belongs to the first class of guidance intersection, and the route-guidance determining processing means determine that the route-guidance simplification conditions do not hold. Moreover, the recommended lane may change from the lane k72 to the lane k71 before the vicinity of the guidance intersection c21. Accordingly, the CPU 31 may determine that the third condition holds, and the guidance intersection c21 belongs to the first class of guidance intersection, such that CPU 31 may determine that the route-guidance simplification conditions do not hold. Consequently, the CPU 31 may perform lane guidance by voice at each of the route guidance points.

Note that when traveling along the searched route Rt11, in the event of performing no lane guidance, as illustrated in FIG. 10, route guidance points h21 through h24 may be set at the points of 700 m, 300 m, 100 m, and 30 m before the guidance intersection c21, and route guidance points h25 and h26 may be set between the intersections ca and cb on the road r22.

Subsequently, during traveling on the road r21, the message of "In about 700 m turn to the right at AA" or the like may be output by voice at the route guidance point h21, the message of "In about 300 m beyond turn to the right at AA" or the like at the route guidance point h22, the message of "Soon, turn to the right. 200 m after that turn to the left at BB" or the like at the route guidance point h23, and an advice sound (beep-beep) may indicate just before the intersection ca at the route guidance point h24.

Also, during traveling on the road r22, the message of "Soon, turn to the left" or the like may be output by voice at the route guidance point h25, and an advice sound (beep-beep) may indicate just before the intersection cb at the route guidance point h26.

Alternately, in the event of performing lane guidance, as illustrated in FIG. 11, route guidance points h31 through h35 may be set at the points of 600 m, 400 m, 300 m, 100 m, and 30 m before the guidance intersection c21, and route guidance points h36 and h37 may be set between the intersections ca and cb on the road r22. Note that a route guidance point hb can be set between the route guidance points h33 and h34.

Subsequently, during traveling on the road r21, the message of "In about 700 m turn to the right. The current lane is the recommended lane" or the like may be output by voice at the route guidance point h31, the message of "Beyond the intersection the recommended lane is changed to the leftmost" or the like at the route guidance point h32, the message of "In about 300 m beyond turn to the right. The leftmost is the recommended lane" or the like at the route guidance point h33, the message of "Soon, turn to the right. 200 m after that turn to the left at BB" or the like at the route guidance point h34, and an advice sound (beep-beep) may indicate just before the intersection ca at the route guidance point h35.

Also, during traveling on the road r22, the message of "Soon, turn to the left" or the like may be output by voice at the route guidance point h36, and an advice sound (beep-beep) may indicate just before the intersection cb at the route guidance point h37.

Note that in the event that the route guidance point hb is set at an arbitrary point from the intersection cr1 to the intersection ca, e.g., between the route guidance points h33 and h34, the message of "Now entering the recommended lane" or the like can be output by voice at the route guidance point hb.

Next, a description is made regarding the case of performing lane guidance by voice at yet another exemplary guidance intersection using simplification processing.

Figure 12:
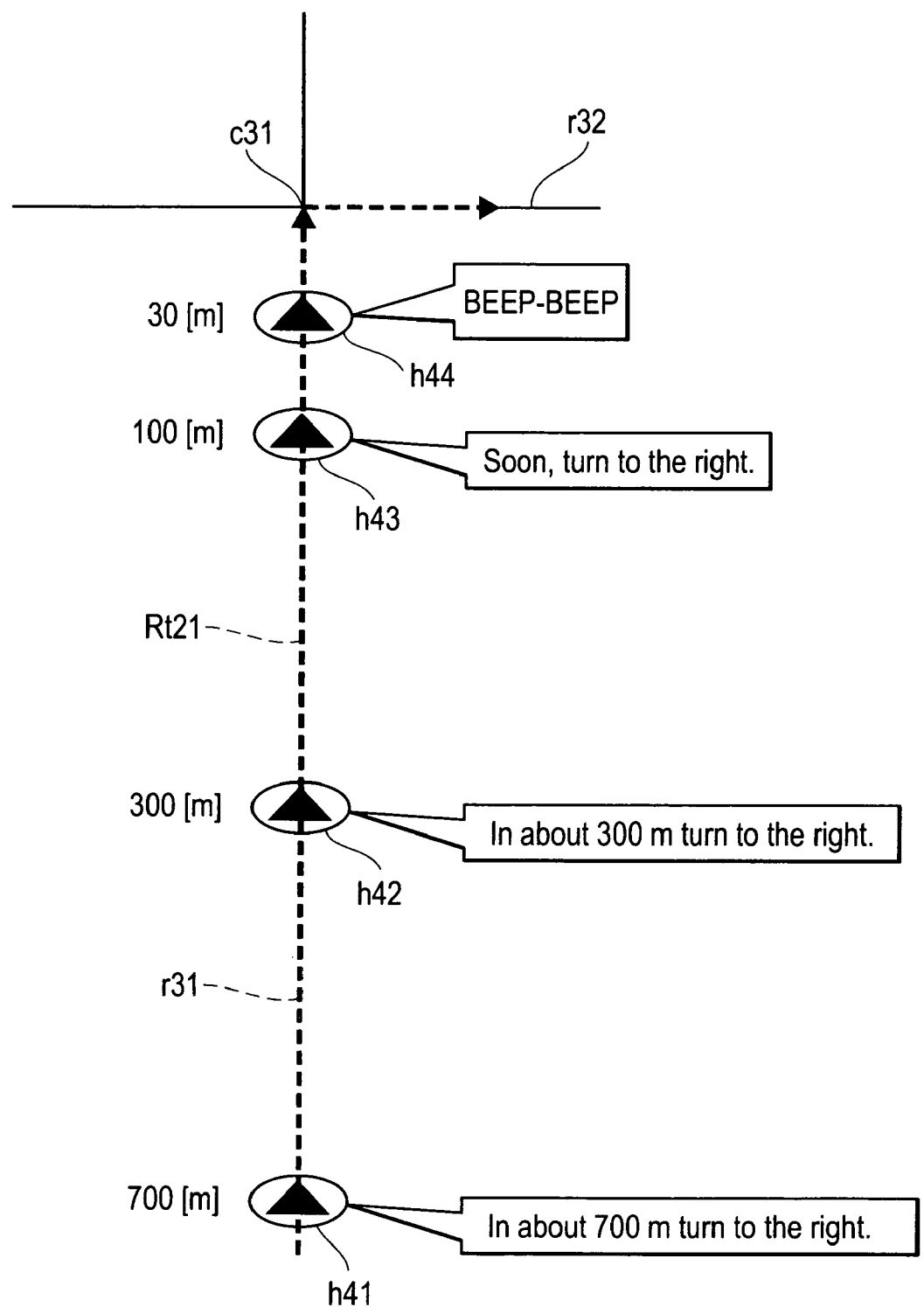
FIG. 12 is a diagram illustrating exemplary route guidance using simplification processing.
Figure 13:
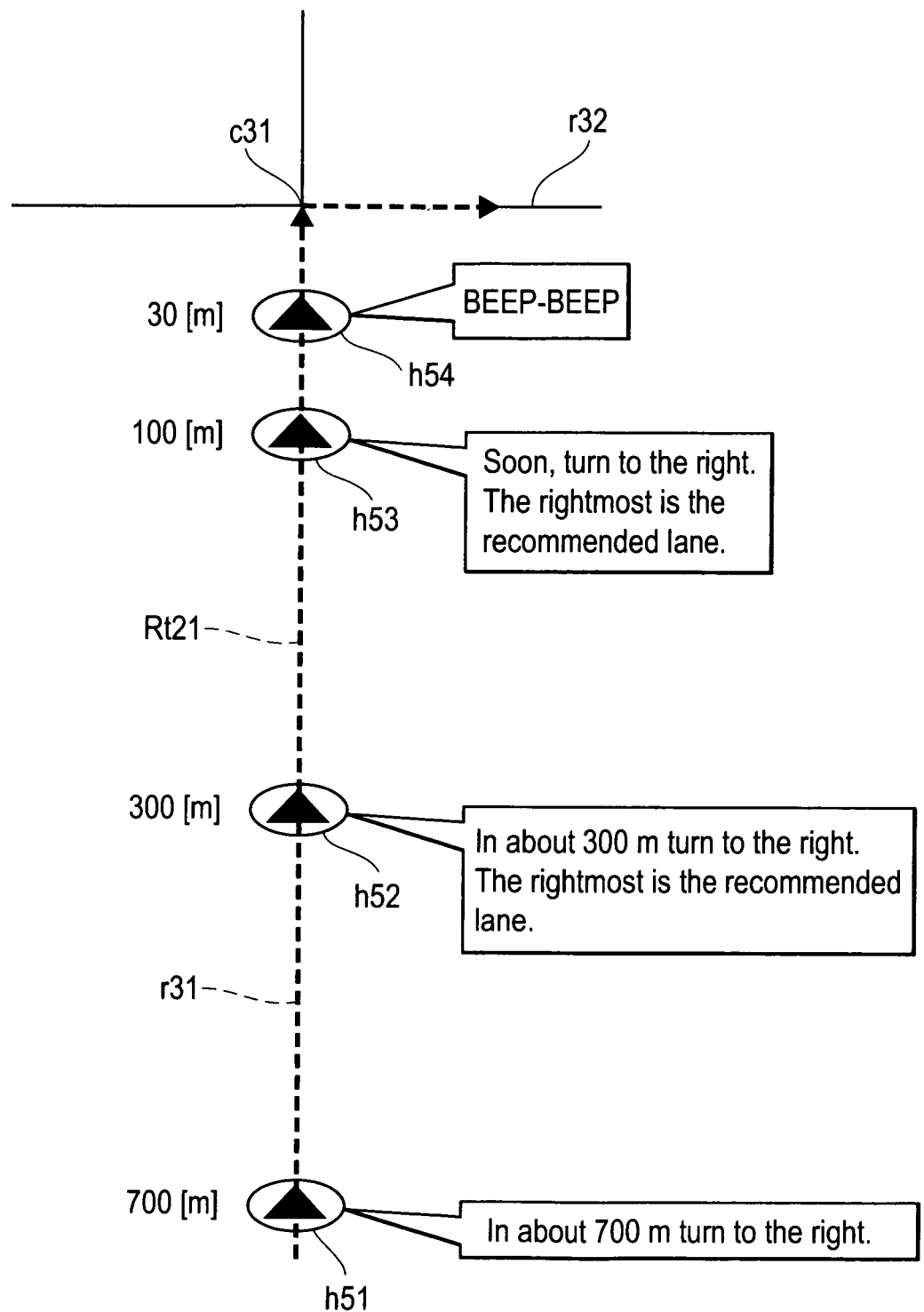
FIG. 13 is a diagram illustrating exemplary route guidance using simplification processing.

FIG. 12 is a first diagram illustrating route guidance using simplification processing regarding another exemplary guidance intersection, and FIG. 13 is a diagram illustrating exemplary route guidance using simplification processing involving another exemplary guidance intersection.

In the drawings, r31 and r32 denote roads, c31 denotes the intersection where the roads r31 and r32 intersect. Rt21 is a searched route. The searched route Rt21 is arranged so as to pass through the roads r31 and r32 in order, and turn to the right at the guidance intersection c31. When traveling along the searched route Rt21, route guidance points h41 through h44 are set at the points of 700 m, 300 m, 100 m, and 30 m before the guidance intersection c31. Let us say that the intersections are not continuously provided at the guidance intersection c31, and moreover, the first through fourth conditions do not hold.

In this case, the CPU 31 may determine that the first through fourth conditions do not hold, and the guidance intersection c31 belongs to the second class of guidance intersection, and CPU 31 may determine that the route-guidance simplification conditions hold. Consequently, the CPU 31 may not perform lane guidance by voice at the first route guidance point h41, and may perform lane guidance by voice only in the case of the vehicle not entering the rightmost lane which is the recommended lane even though approaching the guidance intersection c31.

That is to say, in the event of the vehicle entering the rightmost lane before approaching the guidance intersection c31, as illustrated in FIG. 12, during traveling on the road r31, the message of "In about 700 m turn to the right" or the like may be output by voice at the route guidance point h41, the message of "In about 3 m turn to the right" or the like at the route guidance point h42, the message of "Soon, turn to the right" or the like at the route guidance point h43, and an advice sound (beep-beep) may indicate just before the intersection c31 at the route guidance point h44.

Also, in the event of the vehicle not entering the rightmost lane before approaching the guidance intersection c31, as illustrated in FIG. 13, during traveling on the road r31, the message of "In about 700 m turn to the right" or the like may be output by voice at the route guidance point h51, the message of "In about 300 m turn to the right. The rightmost is the recommended lane" or the like at the route guidance point h52, the message of "Soon, turn to the right. The rightmost is the recommended lane" or the like at the route guidance point h53, and an advice sound (beep-beep) may indicate just before the intersection c31 at the route guidance point h54.

While various features have been described in conjunction with the examples outlined above, various alternatives, modifications, variations, and/or improvements of those features and/or examples may be possible. Accordingly, the examples, as set forth above, are intended to be illustrative. Various changes may be made without departing from the broad spirit and scope of the underlying principles.

What is claimed is:

1. A route guidance system for a vehicle, comprising:
a current-location detecting unit that detects the current location of a vehicle; and
a controller that:
searches a route to a destination based on the current location;
calculates a recommended lane for each road on the searched route;
sets a guidance intersection based on the searched route;
sets a route guidance point at a predetermined point before the guidance intersection;
provides route guidance through the guidance intersection when the vehicle reaches the route guidance point;
determines, regardless of on which lane the vehicle is traveling:
that lane planning cannot readily be performed by a user at the guidance intersection, when the vehicle makes a right turn at the guidance intersection, if there are a plurality of lanes from which the right turn is available and the recommended lane is not a rightmost lane but a lane other than the rightmost lane among the plurality of lanes from which the right turn is available, or when the vehicle makes a left turn at the guidance intersection, if there are a plurality of lanes from which the left turn is available and the recommended lane is not a leftmost lane but a lane other than the leftmost lane among the plurality of lanes from which the left turn is available; and
that the lane planning can readily be performed by the user at the guidance intersection, when the vehicle makes a right turn at the guidance intersection, if there are a plurality of lanes from which the right turn is available and the recommended lane is a rightmost lane among the plurality of lanes from which the right turn is available, or when the vehicle makes a left turn at the guidance intersection, if there are a plurality of lanes from which the left turn is available and the recommended lane is a leftmost lane among the plurality of lanes from which the left turn is available;
performs lane guidance at the route guidance point if it is determined that the lane planning cannot readily be performed by the user at the guidance intersection; and
does not perform the lane guidance at the route guidance point if it is determined that the lane planning can be readily performed by the user at the guidance intersection.

2. The route guidance system according to claim 1, wherein the controller:
determines whether the lane planning can be readily performed by the user at the guidance intersection depending on whether the recommended lane for a road on the searched route approaching the guidance intersection changes in the vicinity of the guidance intersection.

3. The route guidance system according to claim 1, wherein the controller:
determines whether the lane planning can be readily performed by the user at the guidance intersection depending on whether the recommended lane changes between intersections.

4. The route guidance system according to claim 1, wherein the controller:
determines whether the lane planning can be readily performed by the user at the guidance intersection based on a distance necessary for moving between lanes.

5. The route guidance system according to claim 1, wherein the controller:
detects a driving lane at the current location; and
performs the lane guidance at the route guidance point only in the event that the vehicle does not enter the recommended lane for a road on the searched route approaching the guidance intersection even though the vehicle is approaching the guidance intersection.

6. A route guidance method comprising:
detecting the current location of a vehicle;
searching a route to a destination based on the current location;
calculating a recommended lane for each road on the searched route;
setting a guidance intersection based on the searched route;
setting a route guidance point at a predetermined point before the guidance intersection;
providing route guidance through the guidance intersection when the vehicle reaches the route guidance point;
determining, regardless of on which lane the vehicle is traveling:
that lane planning cannot readily be performed by a user at the guidance intersection, when the vehicle makes a right turn at the guidance intersection, if there are a plurality of lanes from which the right turn is available and the recommended lane is not a rightmost lane but a lane other than the rightmost lane among the plurality of lanes from which the right turn is available, or when the vehicle makes a left turn at the guidance intersection, if there are a plurality of lanes from which the left turn is available and the recommended lane is not a leftmost lane but a lane other than the leftmost lane among the plurality of lanes from which the left turn is available, and
that the lane planning can readily be performed by the user at the guidance intersection, when the vehicle makes a right turn at the guidance intersection, if there are a plurality of lanes from which the right turn is available and the recommended lane is a rightmost lane among the plurality of lanes from which the right turn is available, or when the vehicle makes a left turn at the guidance intersection, if there are a plurality of lanes from which the left turn is available and the recommended lane is a leftmost lane among the plurality of lanes from which the left turn is available;

performing lane guidance at the route guidance point if it is determined that the lane planning cannot readily be performed by the user at the guidance intersection; and not performing the lane guidance at the route guidance point if it is determined that the lane planning can be readily performed by the user at the guidance intersection.

7. The route guidance method according to claim 6, further comprising:

determining whether the lane planning can be readily performed by the user at the guidance intersection depending on whether the recommended lane for a road on the searched route approaching the guidance intersection changes in the vicinity of the guidance intersection.

8. The route guidance method according to claim 6, further comprising:

determining whether the lane planning can be readily performed by the user at the guidance intersection depending on whether the recommended lane changes between intersections.

9. The route guidance method according to claim 6, further comprising:

determining whether the lane planning can be readily performed by the user at the guidance intersection based on a distance necessary for moving between lanes.

10. The route guidance method according to claim 6, further comprising:

detecting a driving lane at the current location; and performing the lane guidance at the route guidance point only in the event that the vehicle does not enter the recommended lane for a road on the searched route approaching the guidance intersection even though the vehicle is approaching the guidance intersection.

11. A computer-readable storage medium storing a computer-executable program usable to provide route guidance, the program comprising:

instructions for detecting the current location of a vehicle;

instructions for searching a route to a destination based on the current location;

instructions for calculating a recommended lane for each road on the searched route;

instructions for setting a guidance intersection based on the searched route;

instructions for setting a route guidance point at a predetermined point before the guidance intersection;

instructions for providing route guidance through the guidance intersection when the vehicle reaches the route guidance point;

instructions for determining, regardless of on which lane the vehicle is traveling:

that lane planning cannot readily be performed by a user at the guidance intersection, when the vehicle makes a right turn at the guidance intersection, if there are a plurality of lanes from which the right turn is available and the recommended lane is not a rightmost lane but a lane other than the rightmost lane among the plurality of lanes from which the right turn is available, or when the vehicle makes a left turn at the guidance intersection, if there are a plurality of lanes from which the left turn is available and the recommended lane is not a leftmost lane but a lane other than the leftmost lane among the plurality of lanes from which the left turn is available, and that the lane planning can readily be performed by the user at the guidance intersection, when the vehicle makes a right turn at the guidance intersection, if there are a plurality of lanes from which the right turn is available and the recommended lane is a rightmost lane among the plurality of lanes from which the right turn is available, or when the vehicle makes a left turn at the guidance intersection, if there are a plurality of lanes from which the left turn is available and the recommended lane is a leftmost lane among the plurality of lanes from which the left turn is available;

instructions for performing lane guidance at the route guidance point if it is determined that the lane planning cannot readily be performed by the user at the guidance intersection; and instructions for not performing the lane guidance at the route guidance point if it is determined that the lane planning can be readily performed by the user at the guidance intersection.

* * * * *